July 12, 1960     M. R. LAWSON     2,944,283
CENTERING DEVICE
Filed May 19, 1958     2 Sheets-Sheet 1
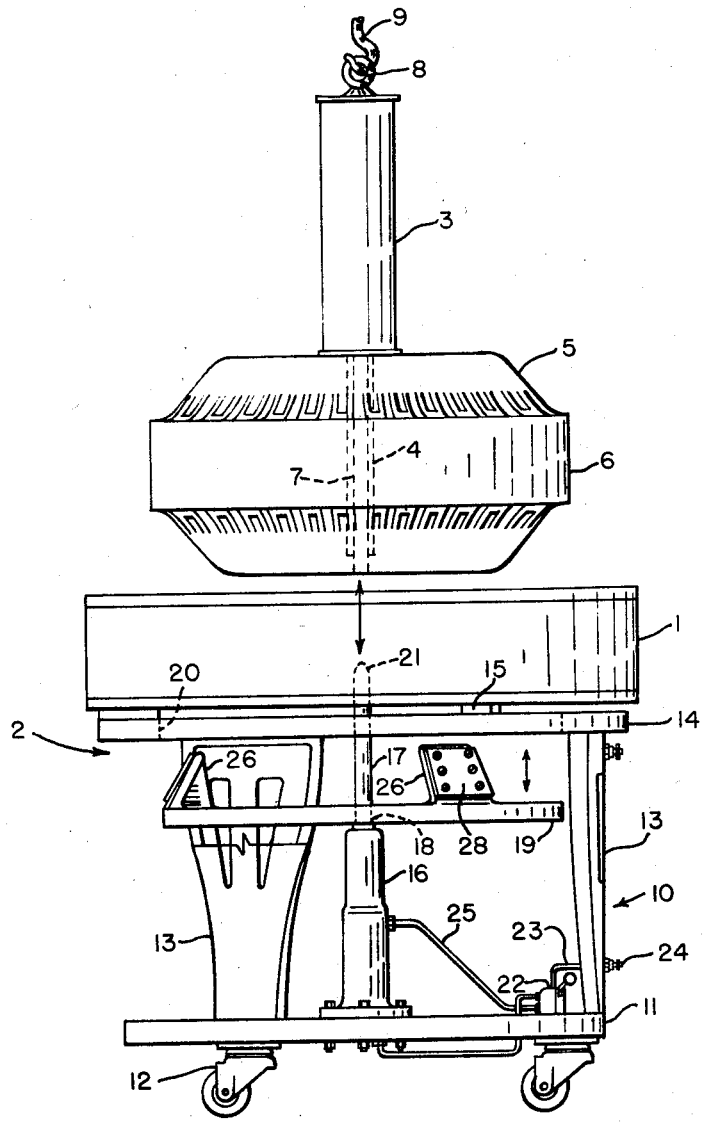
Fig. I
INVENTOR.
MELBOURNE R. LAWSON
BY
Marshall, Marshall & Yeasting
ATTORNEYS July 12, 1960   M. R. LAWSON   2,944,283
CENTERING DEVICE
Filed May 19, 1958   2 Sheets-Sheet 2
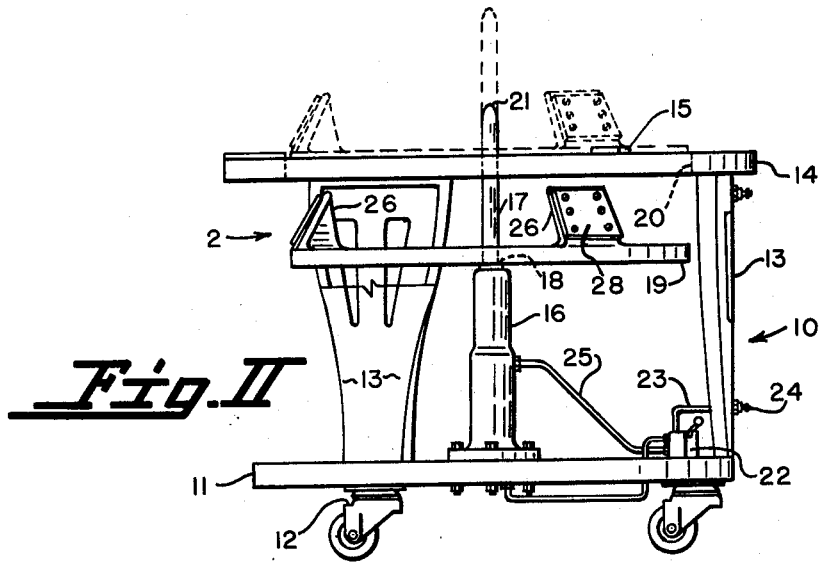
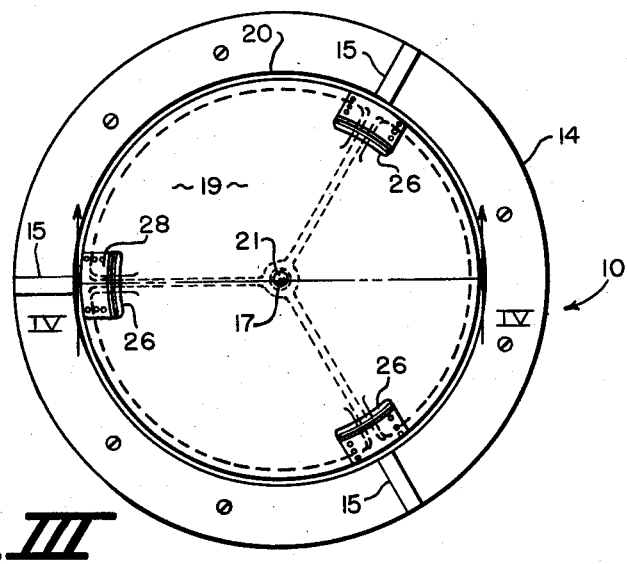
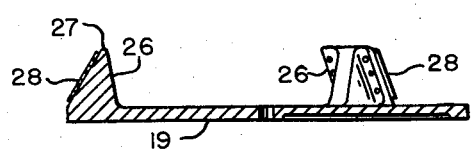
INVENTOR.
MELBOURNE R. LAWSON
BY
ATTORNEYS

United States Patent Office 2,944,283
Patented July 12, 1960

2,944,283

CENTERING DEVICE

Melbourne R. Lawson, Macon, Ga., assignor to Clement O. Dennis, Macon, Ga.

Filed May 19, 1958, Ser. No. 736,307

10 Claims. (Cl. 18—2)

This invention relates to recapping and retreading apparatus for tire casings and particularly to a device for locating a tire casing and a band mold matrix relative to each other.

Various types of band mold matrices are shown and described in U.S. application Serial No. 660,606 which was filed on May 21, 1957 and now abandoned but continued in part as U.S. application Serial No. 773,583 which was filed on November 13, 1958. One of the problems in the use of such mold matrices is the centering of the tire casings concentrically within the annular matrices so that the newly applied treads have uniform thicknesses all around the casings. The mold face of such a matrix is provided with ridges which mold the desired design in the camel back or tread strip, cemented about the periphery of a tire casing, during the curing operation. During the curing operation, the heated camel back or tread strip flows into the tread design in the mold face and if the tire casing is not concentrically located relative to the continuous annular mold face more of the plastic tread rubber will be distributed at some points on the casing than at others, i.e., the finished product will be out of round by having bumps and depressions in the tread.

Another problem in the use of such mold matrices is the locating of the tire casings within the matrices so that the median diametrical planes of the tire casings will coincide with the median diametrical planes of the matrices. If such planes do not coincide, i.e., if the planes are tilted relative to each other, the newly applied treads form helices and if followed going down a road are seen to weave back and forth like snakes and, hence, soon wear out.

It is, accordingly, the principal object of this invention to provide a device for centering a tire casing and a band mold matrix concentrically relative to each other.

Another object of the invention is to provide a device for centering automatically a band mold matrix relative to a reference point.

A further object is to provide a device for so locating a tire casing within a mold matrix that the median diametrical planes of the tire casing and of the mold matrix coincide.

Other objects and advantages will be apparent from the following description in which reference is had to the accompanying drawings.

According to the invention, a centering device is provided which has a reference axis which is common to a band mold matrix and to a tire casing that is loaded into the mold matrix. Means are provided for automatically centering both the mold matrix and the tire casing concentrically relative to the common reference axis. This insures that a newly applied tread on the tire casing has a uniform thickness all around the casing. Such means also simultaneously so locates the tire casing in the mold matrix that the median diametrical planes of the tire casing and the mold matrix coincide.

A preferred form of the centering device is illustrated in the accompanying drawings.

In the drawings:

Fig. I is an elevation view of the centering device showing a tire casing with a camel back or tread strip applied about its periphery being lowered into a centered band mold matrix prior to a curing operation;

Fig. II is a similar elevation view of the centering device illustrated in Fig. I showing its bottom position in solid lines and its upper position in broken lines;

Fig. III is a plan view of the centering device illustrated in Fig. II; and

Fig. IV is a vertical sectional view taken substantially along the line IV—IV of Fig. III.

These specific figures and the accompanying description are intended merely to illustrate the invention and not to limit its scope.

Referring to Fig. I, a band mold matrix 1 is supported by the centering device 2 of the invention. The band mold matrix is not shown in detail because it is not part of the centering device. Various types of band mold matrices are shown and described in detail in the hereinbefore referred to U.S. applications Serial Nos. 660,606 and 773,583. Generally such matrices are in the form of an unbroken annulus which includes an inner body with a substantially vertical tread-forming mold face, a first side skirt having a face contoured to form a first side wall of the mold and a second lid-like side skirt that is freely removable and that has a face contoured to form a second side wall of the mold. The first side skirt has an inside circular edge which is contacted by the centering device 2 to center the matrix as hereinafter described. The face of the mold is provided with ridges which when heated mold the desired design in the camel back or tread strip, applied about the periphery of the tire casing, during the curing operation.

The mold face is of an internal diameter substantially equal to the normal external diameter of the tire casing before the casing has become worn or after the camel back or tread strip has been applied to it. Accordingly, in order to insert the tire casing with the camel back or tread strip thereon in the annular mold matrix, it is necessary to substantially reduce the tread or external diameter of the casing until it will pass through the circular opening of the annular mold matrix. This operation also is necessary in order to facilitate the removal of the casing from the mold matrix following the curing operation.

In order to reduce the external or tread diameter of the casing, a tire bead spreading device similar to the one disclosed in U.S. Patent No. 2,723,425 is used advantageously. Such a tire bead spreading device includes an ordinary air cylinder 3 having a piston therein to which one end of a piston rod 4 is connected and a pair of rims (not shown) each having an annular bead spreading flange thereon adapted to fit inside of a tire casing 5, the casing 5 having a camel back or tread 6 strip cemented about its periphery. The tire bead spreading device, for the purpose of understanding the present invention, can be considered to be exactly like the one disclosed in said patent, except that the lower one of the rims and the piston rod 4 are provided with an axially extending opening 7 so that they form a sleeve which cooperates with the centering device 2 as hereinafter described.

One of the rims is removably connected to the bottom of the cylinder 3 and the other one is removably connected to the piston rod 4 in such a way that when the cylinder is operated the rims move apart. In so doing, the rims force the beads of the tire casing 5 apart in an axial direction correspondingly reducing the tread or external diameter of the casing until it will pass freely within the circular opening of the mold matrix 1. This is the condition of the tire casing 5 as illustrated in Fig. I. In order to facilitate carrying the bead spreader with the tire casing, the upper end of the cylinder 3 is provided with a ring 8 for the reception of a hook 9 of a suitable hoist or the like for raising and lowering the bead spreader and the tire casing in a loading station.

The centering device 2 includes a loading stand 10 having a circular base 11 to which are secured three casters 12 that are located 120 degrees apart. The base 11 supports three vertical legs 13 surmounted by a round horizontal plate 14 having three contact pads 15 formed thereon which also are spaced 120 degrees apart. All three of the contact pads 15 are shown in Fig. III. The loading stand 10, thus, is in the nature of a wheeled table, the upper horizontal surface of the plate 14 functioning as the top of the table.

The base 11 also supports an ordinary air cylinder 16 having a piston therein to which one end of a piston rod 17 is connected, the axis of the piston rod 17 being perpendicular to the plate 14. A shoulder 18 on the piston rod 17 supports a circular plate 19 having a diameter somewhat less than the diameter of a large circular opening 20 in the plate 14, the plate 14, thus, being shaped like a ring which, when the plate 19 is at the same elevation as the plate 14, closely surrounds but does not touch the plate 19. As shown in Fig. III, the plates 14 and 19 and the piston rod 17 have a common center. The end 21 of the piston rod 17 is shaped like the nose of a bullet.

The piston rod 17 and the plate 19 carried thereby are moved from a bottom position shown in Figs. I and II in solid lines to an upper position shown in Fig. II in broken lines. The cylinder 16 is operated by opening manually a valve 22 secured to the base 11. This permits air to flow from a line 23 connected at 24 to a supply of compressed air through the valve to the bottom of the cylinder 16 to lift the piston. As soon as the piston rod 17 and the plate 19 which moves as one therewith reach their upper position, the compressed air within the cylinder 16 flows through a by-pass line 25 back to the valve 22 closing the valve and permitting the piston rod 17 and the plate 19 to move to the bottom position under the influence of gravity. Alternatively, the by-pass line 25 can be eliminated and the cylinder 16 operated by opening manually the valve 22 whereupon the piston rod and the plate rise to their upper position remaining there until the valve 22 is closed manually to shut off the supply of air and release the air from the cylinder so that the piston rod and the plate settle back to the bottom position under the influence of gravity.

When the plate 19 is in its upper position its upper surface is slightly above the upper surface of the plate or ring 14 at about the same height as the upper surfaces of the contact pads 15 on the plate or ring 14. In such position, as shown in Fig. II, angle pads 26 which are formed integrally with the plate 19 are at an elevation above the contact pads 15. There are three of the angle pads 26 spaced 120 degrees apart about the periphery of the plate 19. Each of the angle pads has a slanting face 27 which as shown in Fig. IV slants at an angle of about 30 degrees from the vertical toward the piston rod 17 and is covered with any non-metallic material 28 that is both tough and a poor conductor of heat.

In the operation of the centering device 2, the band mold matrix 1 is placed upon the contact pads 15 of the plate or ring 14 in a position roughly centered relative to the axis of the piston rod 17, the piston rod 17 and the plate 19 carried thereby being in the bottom position. The contact pads 15 function to greatly reduce the area of contact at the bottom of the mold matrix which is preheated in the usual manner before it is set upon the pads 15. The relatively small pads do not allow a significant amount of heat to flow from the mold matrix into the loading stand 10.

The cylinder 16 then is operated to lift the angle pads 26 through the ring 14 to their upper positions. The slanting faces 27 of the angle pads on the way up contact the lower inside circular edge of the annular band mold matrix 1 and automatically shift or cam it to a position on the contact pads 15 that is accurately centered relative to the axis of the piston rod 17 which axis is the reference axis of the centering device. No significant amount of heat escapes from the preheated mold matrix through the angle pads 26 because the facing material 28 on the slanting faces 27 is a poor conductor of heat.

The piston rod 17 and the plate 19 then are returned to the bottom position and the tire casing 5 is lowered and so guided that the opening 7 of the tire spreader receives the piston rod 17, the ring 8 being rockable on the hook 9 of the hoist and the loading stand 10 being positionable relative to the tire casing 5 by virtue of the casters 12 so that it is an easy matter to cause the piston rod 17 to be so received. This locates the tire casing 5 concentrically within the mold matrix 1, since the tire casing 5 and the mold matrix are centered concentrically with respect to the common reference axis, i.e., the axis of the piston rod 17. The centering of the tire casing concentrically within the mold matrix insures that the newly applied tread will have a uniform thickness all around the casing. During the curing operation, the heated camel back or tread strip 6 flows into the tread design in the mold face of the matrix and if the tire casing is not concentrically located relative to the mold face more of the plastic tread rubber will be distributed at some points on the casing than at others.

Furthermore, positioning the tire casing 5 in the mold matrix with the piston rod 17 received in the opening 7 prevents the casing from being tilted horizontally relative to the mold matrix during loading, because the mold matrix is supported upon the contact pads 15 the upper surfaces of which are in a plane that is perpendicular to the axis of the piston rod. This locates the tire casing so that, when the air is released from the cylinder 3 of the tire bead spreader, the tire casing will assume a position such that the median diametrical planes of the tire casing and of the mold matrix coincide. If such planes do not coincide, i.e., if the planes are tilted relative to each other, the newly applied tread forms a helix and if followed going down a road is seen to weave back and forth like a snake and, hence, soon wears out.

After the release of air from the cylinder 3 of the tire bead spreader, the inherent resiliency of the walls of the tire casing 5 cause the beads to move inwardly toward each other to their normal positions. The tire bead spreader then is removed from the tire casing as described in the hereinbefore referred to U.S. Patent No. 2,723,425 and the mold matrix 1 is conditioned for the curing cycle as shown and described in the hereinbefore referred to U.S. applications Serial Nos. 660,606 and 773,583. The mold matrix is removed from the loading stand, which easily can be rolled to any convenient unloading station, for the curing cycle and another mold matrix placed upon the loading stand to be centered and then loaded.

The embodiment of the invention described in connection with the drawings is to be regarded as illustrative only since the invention is susceptible to variation, modification and change within the spirit and scope of the appended claims.

Having described the invention, I claim:

1. A centering device for locating a tire casing and a band mold matrix relative to each other during a loading operation in which a loading device having a centrally located sleeve is used, said centering device comprising, in combination, a base, wheel means supporting the base, a substantially horizontal plate erected from and stationary relative to the base, a guide rod defining a reference axis, the mold matrix being placed upon the plate in a position such that it is roughly centered relative to the reference axis, cam means concentric relative to the reference axis, and means for moving the cam means from a first position below the plate to a second position above the plate, the cam means being adapted to contact the mold matrix as it is moved to the second position to shift the mold matrix on the plate to a centered position relative to the reference axis, said guide rod cooperating with the sleeve of the loading device to guide the tire casing into a centered position in the centered mold matrix.

2. A centering device for locating a tire casing and a band mold matrix relative to each other during the loading operation in which a loading device having a centrally located sleeve is used, said centering device comprising, in combination, a base, a guide rod defining a reference axis, a substantially horizontal ring erected from and stationary relative to the base, the mold matrix being placed upon the ring in a position such that it is roughly centered relative to the reference axis, cam means that is concentric relative to the reference axis and that has a diameter slightly less than the inside diameter of the ring whereby the cam means can pass through the ring, and means for lifting the cam means through the ring from a first position below the ring to a second position above the ring, the cam means being adapted to contact the mold matrix as it moves through the ring to its second position to shift the mold matrix on the ring to a position such that the mold matrix is centered relative to the reference axis, said guide rod cooperating with the sleeve of the loading device to guide the tire casing into a centered position in the centered mold matrix.

3. A centering device for locating a tire casing and a band mold matrix relative to each other during a loading operation in which a loading device having a centrally located sleeve is used, said centering device comprising, in combination, a base, a substantially horizontal plate erected from and stationary relative to the base, a piston rod defining a reference axis, cam means carried by the piston rod and concentric relative to the reference axis, the mold matrix being placed upon the plate in a position such that it is roughly centered relative to the reference axis, and cylinder means for moving the piston rod and the cam means carried thereby from a first position below the plate to a second position above the plate, the cam means being adapted to contact the mold matrix as it is moved to the second position to shift the mold matrix on the plate to a centered position relative to the reference axis, said piston rod cooperating with the sleeve of the loading device to guide the tire casing into a centered position in the centered mold matrix.

4. A centering device for locating a tire casing and a band mold matrix relative to each other during a loading operation in which a loading device having a centrally located sleeve is used, said centering device comprising, in combination, a base, a piston rod defining a reference axis, cam means carried by the piston rod and concentric relative to the reference axis, a substantially horizontal ring erected from and stationary relative to the base, the mold matrix being placed upon the ring in a position such that it is roughly centered relative to the reference axis, the diameter of the cam means being such that it can pass through the ring, and cylinder means for lifting the piston rod and the cam means carried thereby from a first position below the ring to a second position above the ring, the cam means being adapted to contact the mold matrix as it moves through the ring to its second position to shift the mold matrix on the ring to a position such that the mold matrix is centered relative to the reference axis, said piston rod being adapted to be received by the sleeve of the loading device to guide the tire casing into a centered position in the centered mold matrix.

5. A centering device for locating a tire casing and a band mold matrix relative to each other, said device comprising, in combination, a base wheel means supporting the base, a substantially horizontal plate erected from and stationary relative to the base, means defining a reference axis, the mold matrix being placed upon the plate in a position such that it is roughly centered relative to the reference axis, cam means comprising a circular member concentric relative to the reference axis and a plurality of angle pads on the upper surface of the member along its periphery, each of the angle pads being slanted from the vertical toward the reference axis, and means for moving the cam means from a first position below the plate to a second position above the plate, the angle pads being adapted to contact the mold matrix as they are moved to the second position to shift the mold matrix on the plate to a centered position relative to the reference axis.

6. A centering device for locating a tire casing and a band mold matrix relative to each other, said device comprising, in combination, a base, wheel means supporting the base, means defining a reference axis, a substantially horizontal ring erected from and stationary relative to the base, the mold matrix being placed upon the ring in a position such that it is roughly centered relative to the reference axis, cam means comprising a circular member concentric relative to the reference axis and a plurality of angle pads on the upper surface of the member along its periphery, each of the angle pads being slanted from the vertical toward the reference axis, the circular member having a diameter less than the inside diameter of the ring whereby it can pass through the ring, and means for lifting the cam means through the ring from a first position below the ring to a second position above the ring, the angle pads being adapted to contact the mold matrix as they move through the ring to their second position to shift the mold matrix on the ring to a position such that the mold matrix is centered relative to the reference axis.

7. A centering device for locating a tire casing and a band mold matrix relative to each other, said device comprising, in combination, a base, wheel means supporting the base, a substantially horizontal plate erected from and stationary relative to the base, a piston rod defining a reference axis, cam means comprising a circular member carried by the piston rod and concentric relative to the reference axis and a plurality of angle pads on the upper surface of the member along its periphery, each of the angle pads being slanted from the vertical toward the reference axis, the mold matrix being placed upon the plate in a position such that it is roughly centered relative to the reference axis, and cylinder means for moving the piston rod and the cam means carried thereby from a first position below the plate to a second position above the plate, the angle pads being adapted to contact the mold matrix as they are moved to the second position to shift the mold matrix on the plate to a centered position relative to the reference axis.

8. A centering device for locating a tire casing and a band mold matrix relative to each other during a loading operation in which a loading device is used, said centering device comprising, in combination, a base, a piston rod defining a reference axis, cam means comprising a circular member carried by the piston rod and concentric relative to the reference axis and a plurality of angle pads on the upper surface of the member along its periphery, each of the angle pads being slanted from the vertical toward the reference axis, a substantially horizontal ring erected from and stationary relative to the base, the mold matrix being placed upon the ring in a position such that it is roughly centered relative to the reference axis, the diameter of the member being such that it together with the angle pads can pass through the ring, and cylinder means for lifting the piston rod and the cam means carried thereby from a first position below the ring to a second position above the ring, the angle pads being adapted to contact the mold matrix as they pass through the ring to the second position to shift the mold matrix on the ring to a position such that the mold matrix is centered relative to the reference axis, said piston rod being adapted to cooperate with the loading device and thereby guide the tire casing into the centered position in the centered mold matrix.

9. A stand for locating a tire casing and a band mold matrix relative to each other during a loading operation in which a loading device having a centrally located sleeve is used, said stand comprising, in combination, a guide rod defining a vertical reference axis, a horizontal member stationarily mounted relative to the reference axis, the mold matrix being placed upon the member in a position such that it is roughly centered relative to the reference axis, cam means concentric relative to the reference axis, and means for moving the cam means from a first position below the member to a second position above the member, the cam means contacting the mold matrix during movement to the second position to shift the mold matrix on the member to a centered position relative to the reference axis, said guide rod cooperating with the sleeve of the loading device to guide the tire casing into a centered position in the centered mold matrix, said guide rod being adapted to cooperate with the loading device for guiding the tire casing into a centered position in the centered mold matrix.

10. A wheeled stand for holding and centering a band mold matrix in a loading station, said stand comprising, in combination, a piston rod defining a reference axis, drive means for the piston rod, a ring stationarily mounted relative to the reference axis, and cam means carried by the piston rod through the ring from a position below the ring to a position above the ring for horizontally shifting a band mold matrix on the ring into a centered position relative to the reference axis.

References Cited in the file of this patent
UNITED STATES PATENTS

| | | |
|---|---|---|
| 1,271,589 | Lauer | July 9, 1918 |
| 1,809,856 | Lehman | June 16, 1931 |
| 2,030,861 | Fisher | Feb. 18, 1936 |
| 2,793,397 | Barefoot | May 28, 1957 |